Sept. 15, 1964  M. V. FRIEDELL  3,148,700
PRESS BUTTON VALVE
Filed Nov. 30, 1962

INVENTOR.
MORLEY V. FRIEDELL
BY
ATTORNEY

United States Patent Office 3,148,700
Patented Sept. 15, 1964

3,148,700
PRESS BUTTON VALVE
Morley V. Friedell, Lakewood, Colo., assignor to Clark-Feather Mfg. Co., Fort Morgan, Colo., a corporation of Colorado
Filed Nov. 30, 1962, Ser. No. 241,402
5 Claims. (Cl. 137—454.5)

This invention relates to a press button valve that is, to a valve for the control of the flow of fluids and gases by the actuation of a press button on the valve.

The principal object of the invention is to provide a press button valve assembly which will be exceedingly economical to manufacture and assemble and which will provide a highly efficient long-lived, leak-proof valve for intermittent uses.

Another object is to provide a valve of the above type which will be especially useful for thumb controlled compressed air blow guns and fluid jets and to so construct the valve that it can be quickly connected to cause air to flow into and to allow air to exhaust from pneumatically actuated devices.

A further object is to provide a unitary assembly of the entire valve and seat structure of a valve which can be quickly and easily removed from or replaced in a valve body as a single, preassembled unit.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

Figure 1:
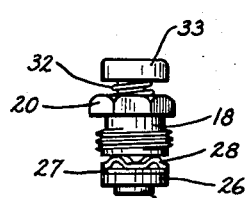
FIG. 1 is a side elevational view of the unitary valve and seat structure of the improved valve.
Figure 2:
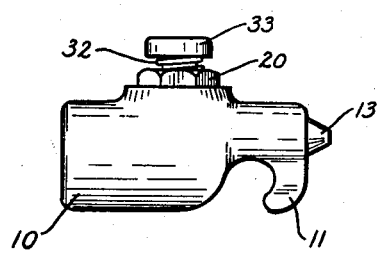
FIG. 2 is a side elevational view of an air flow gun in which the unitary valve and seat structure of FIG. 1 has been embodied.
Figure 3:
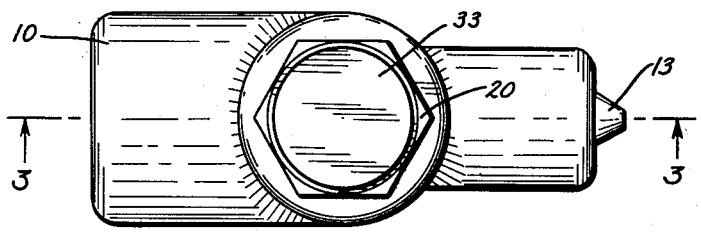
FIG. 3 is a top plan view of the blow gun of FIG. 2.
Figure 4:
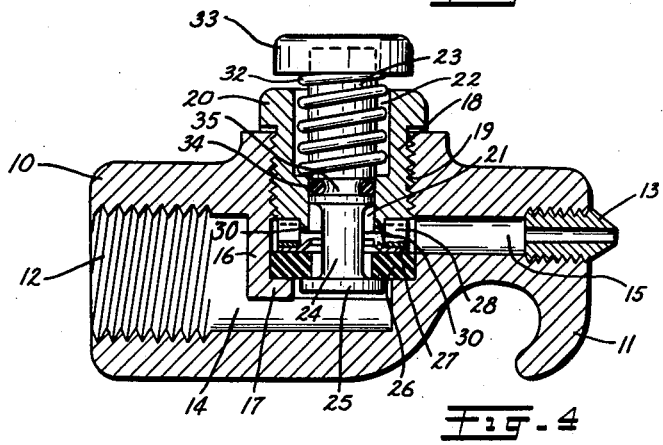
FIG. 4 is an enlarged, vertical, longitudinal, medial section taken on the line 4—4, FIG. 1.

The valve and seat assembly can be incorporated in any desired valve body or housing depending upon the use made thereof. As an example of such use, it has been illustrated in a valve body 10 provided with a hanging hook 11, internal treads 12 for receiving a conventional hose fitting and with a jet nozzle 13 for use as a blow gun. The jet nozzle 13 could be replaced by a suitable pipe or tubing fitting for other uses if desired. The principal advantages of this invention result from the unitary valve and seat assembly which in this instance is used in the blow gun valve body 10 but could be incorporated in any desired type of valve body.

The valve body in any case would provide an intake passage 14 separated from a discharge passage 15 by a valve chamber 16, the bottom of the latter having an annular shelf flange 17, the open center of which provides communication between the passages 14 and 15. The valve assembly of this invention is designed to control the flow through the open center of the shelf flange 17.

The above valve assembly is illustrated in FIG. 1 and comprises an externally threaded body bushing 18 adapted to be threaded into internal threads 19 in the valve chamber 16 of the valve body so as to be concentrically aligned with the shelf flange 17. The body bushing 18 is formed with a hexagonal wrench portion 20 at its top, to facilitate the assembly, and is provided with an axially positioned internal stem bore 21, the upper portion of which is counterbored to form a cylindrical spring socket 22.

A valve stem 23 is axially slidable in the stem bore 21 and is sealed therein by means of a resilient O-ring 34 mounted in a circumferential groove 35 in the stem 23. The lower portion of the stem 23 is reduced in diameter to form a spool portion 24, terminating at its bottom in a circumferentially projecting, flat valve head 25 having a diameter substantially in excess of the diameter of the stem 23 and less than the opening diameter in the shelf flange 17. An annular, resilient valve seat element 26, a conical centering washer 27, and an annular corrugated spacing washer 28 surround the spool portion 24 of the stem and are maintained in place thereon by the projecting valve head 25.

The seat element 26 is preferably formed of rubber or similar elastic resilient material and is positioned directly on and against the valve head 25. The seat element has an outer diameter substantially corresponding to the external diameter of the body bushing 18 and an internal diameter substantially equal to the diameter of the valve stem. Thus, the internal diameter of the seat element exceeds the diameter of the spool portion 24, so as to allow a flow passage therebetween, and is less than the diameter of the head 25, so that the latter may provide a closure therefor.

Figure 6:
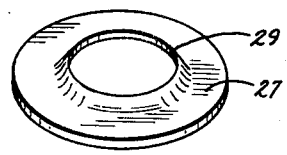
FIG. 6 is a similar perspective view of a conical centering washer as used in the invention.

The centering washer 27, shown more in detail in FIG. 6, rests upon the seat element 26 and has an external and an internal diameter substantially equal to the external and internal diameters, respectively, of the seat element 26. The washer 27 is stamped to provide an annular, upwardly-inclined, conical, medial portion 29 about which the corrugated spacing washer 28 rests. In fact, the raised medial portion 29 acts to maintain the centering washer 27 concentric on the spacing washer 28.

Figure 5:
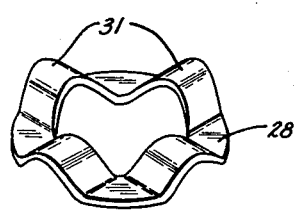
FIG. 5 is a perspective view of a corrugated spacing washer as used in the improved valve and seat structure.

The corrugated spacing washer 28, shown more in detail in FIG. 5 is positioned between the washer 27 and the body bushing 18 and is maintained concentric with the latter by a downwardly-projecting annular flange 30 which fits snugly within the spacing washer to maintain both the spacing washer and the centering washer in concentric position. The spacing washer 28 is radially corrugated, as indicated by the corrugations 31 in FIG. 5, to allow free flow between the body bushing 18 and the spacing washer 27.

The elements 26, 27 and 28 are resiliently clamped together on the bushing 18, after assembly, by means of a compression spring 32 positioned in the spring socket 22 and compressed between the bottom of the spring socket and a finger button 33 which is fixedly pressed onto the upper extremity of the valve stem 23 to maintain the entire valve and seat assembly as a complete assembled unit ready to be threaded into any suitable valve body. It will be noted that the threading of the valve bushing into the valve body causes the valve seat element 26 to make fixed sealing contact with the shelf flange 17 to provide a removable valve seat on the latter and also compresses both the corrugated washer 28 and the seat element 26 so as to permanently maintain the seal between the valve and seat assembly and the valve body.

It can be seen that when the insertion of the valve and seat assembly in the valve body has been completed, flow from the intake passage 14 to the discharge passage 15 is completely shut-off by the contact of the valve head 25 with the seat element 26. To open the valve, it is only necessary to press the button 33 to cause a separation between 25 and 26 to allow flow through the seat element and through the interstices in the corrugated washer 28 to the discharge passage 15. Release of the button 33 allows the valve to instantly close under the bias of the spring 32 and the pressure in the passage 14.

For some uses such as on valves for admitting air to pneumatic cylinders and other pneumatic operating devices, it is usually necessary to provide exhaust valves to relieve the pressure when the pneumatic operation is completed to allow the mechanism to return to normal. For such uses, the present valve can be quickly adapted for both pressure and exhaust use. This is accomplished by simply removing the O-ring 34. Leakage around the stem 23 is resisted when the valve is open by the contact of the bottom 33 against the bushing 18 and when the button is released the pressure in the passage 15 will be quickly relieved by leakage between the stem 23 and its bore 21 so that the valve can serve a double purpose.

It is desired to call attention to the fact that the spring 32 fits relatively close about the valve stem 23 and also fits relatively close within the spring socket 22 so that the spring serves as guide bushing for the stem to maintain the latter in accurate axial alignment. This arrangements permits a much shorter and neater stem to be used than in the usual valve construction.

While a specific form of the invention has been described and illustrated herein, it is to be understood that the same may be varied, within the scope of the appended claims, without departing from the spirit of the invention.

Having thus described the invention what is claimed and desired to be secured by Letters Patent is:

1. A valve comprising:
   (a) A valve body having an intake passage, a discharge passage and a valve chamber positioned between said passages, said chamber having an internally threaded open top and having an open bottom communicating with said intake passage and having a side outlet communicating with said discharge passage;
   (b) an annular shelf flange surrounding the open bottom of said chamber;
   (c) a body bushing having a downwardly extending annular flange formed thereon threaded into the open top of said chamber;
   (d) a valve stem extending axially through said bushing and extending upwardly and downwardly therefrom, the lower portion of said valve stem being reduced in diameter to allow fluid flow thereabout;
   (e) an enlarged valve head on the lower extremity of said valve stem;
   (f) an annular valve seat element having an axial flow passage surrounding said stem immediately above said valve head, said seating element resting on said shelf flange;
   (g) an annular corrugated washer surrounding said stem between said bushing and said seat element and communicating pressure to force the latter against said shelf flange, said flange on said bushing entering said corrugated washer to maintain the latter concentric with said valve stem; and
   (h) spring means urging said stem upwardly to resiliently maintain said head against the bottom of said seating element so that said stem may be manually depressed to allow flow through said seating element and through said corrugated washer to said discharge passage.

2. A valve as described in claim 1 having a centering washer positioned between said corrugated washer and said seat element and a raised annular concentric flange-like portion on said centering washer, said latter portion entering said corrugated washer to maintain said centering washer concentric with said valve stem.

3. A valve as described in claim 2 having an O-ring surrounding said valve stem above the reduced in diameter portion in sealing engagement with the interior of said bushing to resist upward flow about said stem.

4. A valve as described in claim 3 having a press button fixed on the upper extremity of said valve stem for forcing the latter downwardly.

5. A valve as described in claim 4 in which the spring means comprises a cylindrical spring positioned in a spring socket in said bushing and surrounding said stem, said spring being compressed between said button and said bushing to exert an upward bias on said stem.

References Cited in the file of this patent
UNITED STATES PATENTS

| | | |
|---|---|---|
| 1,582,511 | Coberly | Apr. 27, 1926 |
| 2,255,879 | Garvey | Sept. 16, 1941 |
| 2,591,514 | Courtot | Apr. 1, 1952 |
| 3,045,694 | Hammon | July 24, 1962 |